OR 3,883,217

United States Patent

Love et al.

[11] 3,883,217

[45] May 13, 1975

[54] OPTICAL COMMUNICATION SYSTEM

[75] Inventors: Roy E. Love, Corning; Frank L. Thiel, Painted Post, both of N.Y.

[73] Assignee: Corning Glass Works, Corning, N.Y.

[22] Filed: July 5, 1973

[21] Appl. No.: 376,575

[52] U.S. Cl. .......................... 350/96 C; 350/96 WG

[51] Int. Cl. .............................................. G02b 5/14

[58] Field of Search........... 350/96 R, 96 B, 96 WG, 350/96 C

[56] References Cited

UNITED STATES PATENTS 3,327,584 6/1967 Kissinger....................... 350/96 B X 3,455,625 7/1969 Brumley et al. ................ 350/169 X

*Primary Examiner*—Ronald L. Wibert

*Assistant Examiner*—F. L. Evans

*Attorney, Agent, or Firm*—William J. Simmons, Jr.; Walter S. Zebrowski; Clarence R. Patty, Jr.

[57] ABSTRACT

An optical communication system for interconnecting a plurality of remotely located stations. Each station is coupled to a passive optical coupler by an optical signal transmission line. An optical signal transmitted from any one of the stations over its associated transmission line is received by the coupler which couples a portion of the optical signal to the transmission lines associated with all of the remaining stations.

3 Claims, 5 Drawing Figures

OPTICAL COMMUNICATION SYSTEM

Cross-Reference to Related Application

This application is related to application Ser. No. 376,581 entitled "Coupler for Optical Communication System" filed on even date herewith and to application Ser. No. 395,165 entitled "Coupler for Optical Communication System" filed Sept. 7, 1973, both assigned to the assignee of the present application.

BACKGROUND OF THE INVENTION

The continually increasing amount of traffic that communication systems are required to handle has hastened the development of high capacity systems. Even with the increased capacity made available by systems operating between $10^9$ and $10^{12}$ Hz, traffic growth is so rapid that saturation of such systems is anticipated in the very near future. High capacity communication systems operating around $10^{15}$ Hz are needed to accommodate future increases in traffic. These systems are referred to as optical communication systems since $10^{15}$ Hz is within the frequency spectrum of light. Conventional electrically conductive waveguides which have been employed at frequencies between $10^9$ and $10^{12}$ Hz are not satisfactory for transmitting information at carrier frequencies around $10^{15}$ Hz.

The transmitting media required in the transmission of frequencies around $10^{15}$ Hz are hereinafter referred to as optical signal transmission lines or merely transmission lines which may consist of a single optical waveguide or a bundle thereof. Optical waveguides normally consist of an optical fiber having a transparent core surrounded by a layer of transparent cladding material having a refractive index which is lower that of the core. Although the theory of optical waveguides has been known for some time, practical optical waveguides that do not absorb an excessive amount of transmitted light have been developed only recently.

In ships, aircraft and fixed installations such as buildings there is often a need for a communication network to interconnect a plurality of remotely disposed stations. To establish an optical communication system between such stations, a variety of interconnection schemes may be utilized that are analagous to electrical systems. Each station could be "hard wired" to every other station, but when many must be interconnected, the excessive amount of optical signal transmission line required causes this method to be undesirable due to both the cost of the transmission line and the space consumed thereby. The stations may be interconnected by a loop or line data bus which drastically reduces the required amount of optical signal transmission line, but, as will be hereinafter described, the large number of couplers required in such a system introduces an excessive amount of loss, especially in those systems in which there are many stations.

SUMMARY OF THE INVENTION

It is therefore an object of the present invention to provide a low loss optical communication system.

Briefly, the present invention relates to an optical communication system comprising a plurality of stations between which information must be transferred. A plurality of optical signal transmission lines are provided, each having first and second ends. The first end of each transmission line is coupled to a corresponding one of the stations. Passive optical coupler means is connected to the second ends of the transmission lines for receiving an optical signal from a transmission line connected to any one of the stations and coupling a portion of that signal to the transmission lines associated with all of the remaining stations.

DESCRIPTION OF THE PREFERRED EMBODIMENT

Figure 1:
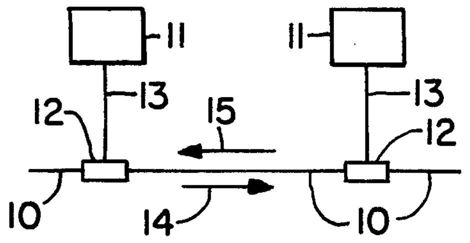
Fig. 1 (PRIOR ART)
FIG. 1 is a schematic diagram of a portion of a prior art communication system.

In those situations wherein a plurality of stations are to be interconnected by optical signal transmission lines, optical line or optical loop data buses can be constructed using such transmission lines. Such configurations are analogous to well-known electrical data buses. FIG. 1 schematically illustrates a portion of a loop or line data bus. In the case of a loop data bus, a number of stations 11 are connected to a common optical signal transmission line 10 which has no end. In principle, data could circulate around the loop many times, but in practice, attenuation can be made large enough that the data is not detectable after one circuit of the loop. Optical signals are extracted from transmission line 10 and injected into transmission line 10 by couplers 12 which are coupled to stations 11 by transmission lines 13. Transmission in the loop can be either unidirectional, e.g., each station transmits only in the direction of arrow 14, or bidirectional, in which case each station transmits in both directions as indicated by arrows 14 and 15. The line data bus consists of a number of stations all of which are connected to a common optical signal transmission line, the ends of which are not joined. As in the case of the loop, transmission in the line data bus can be either unidirectional or bidirectional. It is noted, however, that if each station must communicate with every other station, then operation must be in a bidirectional mode.

Figure 2:
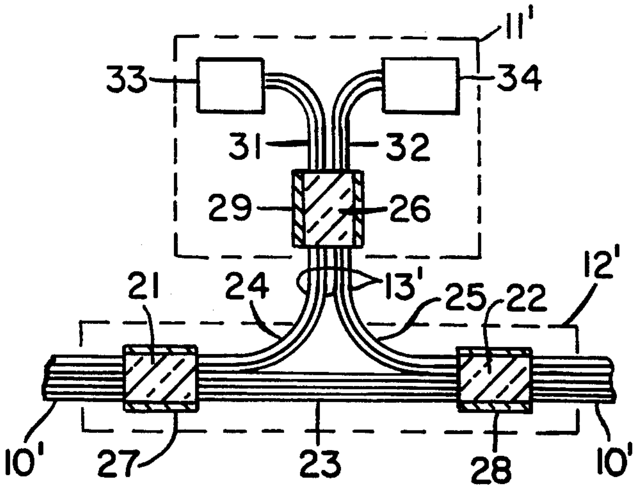
FIG. 2 is a schematic diagram of a coupler which may be used in the system of FIG. 1.

Each station associated with a loop or line data bus requires a coupler for coupling optical signals to and from the main transmission line. Each coupler requires one or more transmission line connectors, mixers, and the like which introduce losses. A furcated coupler suitable for use in a loop or line data bus is illustrated in FIG. 2 wherein elements similar to those of FIG. 1 are represented by primed reference numerals. One section of transmission line 10' is coupled to a first endface of mixer rod 21, a second section of transmission line 10' being coupled to a first endface of mixer rod 22. The second endfaces of mixer rods 21 and 22 are interconnected by a first bundle 23 of optical waveguide fibers. Bundles 24 and 25 of optical waveguide fibers connect the second endfaces of mixers 21 and 22, respectively, to the first endface of a third mixer rod 26. Mixer rods 21, 22 and 26 consist of transparent material and may be provided with layers 27, 28 and 29, respectively, of transparent cladding material which cooperate with the surfaces of the rods to form light-reflecting interfaces. Fiber bundles 31 and 32 are connected between the second endface of mixer rod 26 and a light detector 33 and source 34, respectively. As used herein, "transparent" indicates transparency to those wavelengths of light propagated by the optical signal transmission lines.

The function of each mixer rod is to distribute, by the process of direct propagation as well as internal reflection from the interface between the core and cladding, an optical signal from any fiber at one endface thereof to all of the fibers at the other endface thereof. A portion of the optical signal propagating in either of the transmission line sections 10' is coupled to the other section 10' by optical fiber bundle 23 and mixer rods 21 and 22. The arrangement shown in FIG. 2 is bidirectional in that optical signals from both of the transmission line sections 10' are coupled by mixer rods 21 and 22 and optical waveguide bundles 24 and 25 to mixer rod 26 which couples the optical signal from either bundle 24 or 25 to detector 33. In a similar manner, optical signals from source 34 are coupled by mixer rod 26 to bundles 24 and 25 so that the propagation of optical signals is initiated in both of the transmission line sections 10'.

Figure 3:
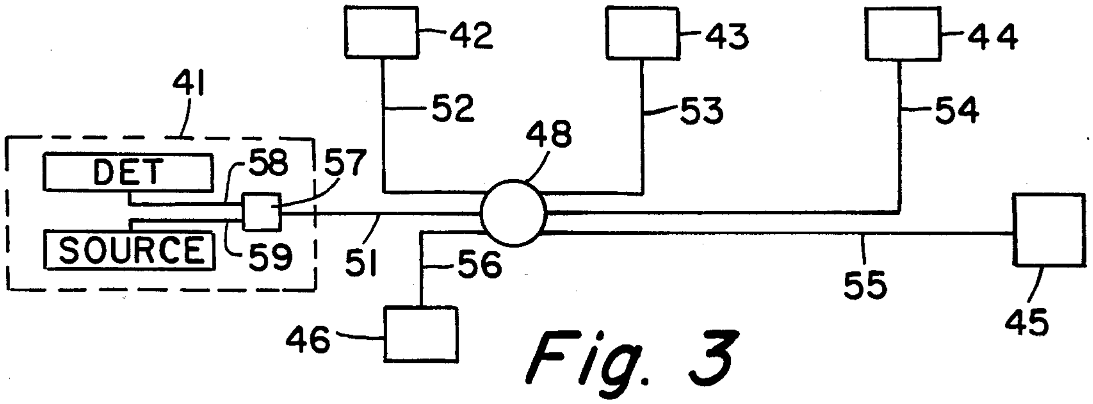
FIG. 3 is a schematic diagram of the optical communication system of the present invention.

Losses occur at mixing rods 21 and 22 and at the connectors which are required to couple transmission line sections 10' to the mixers. In systems such as that illustrated in FIG. 1, signal attenuation due to connector or coupler insertion loss rises directly with the number of stations located between the two communicating stations. It would therefore be advantageous to provide an optical communication system in which an optical signal is propagated from one station to a plurality of other stations without passing through a coupler at each of the stations. The optical communication system of the present invention, which is schematically illustrated in FIG. 3, exhibits this advantage. A plurality of stations 41 through 46 are connected to a common passive coupler 48 by optical signal transmission lines 51 through 56, respectively. Each of the stations 41 through 46 may also include a mixer rod such as rod 26 of FIG. 2. For the sake of simplicity, only station 41 is illustrated as including such a feature, mixer rod 57 being connected to a light detector and a light source by bundles 58 and 59 of optical waveguides. Coupler 48 is adapted to receive an optical signal from any one of the stations and couple a portion of that signal to the transmission line associated with each of the other stations. Two optical signal couplers which can be used in the system of the present invention are illustrated in FIGS. 4 and 5, the coupler of FIG. 4 being disclosed and claimed in said related application.

Figure 4:
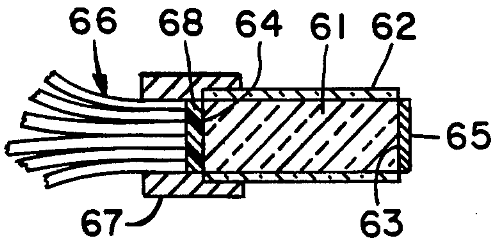
FIG. 4 is a cross-sectional view of a passive coupler which may be utilized in the system of FIG. 3.

The coupler of FIG. 4 consists of a cylindrically shaped transparent mixer rod 61 having a layer 62 of transparent cladding material disposed upon the surface thereof, the refractive index of layer 62 being lower than that of rod 61. Endfaces 63 and 64 of rod 61 are polished and are substantially perpendicular to the longitudinal axis thereof. Endface 63 is provided with a light reflecting coating 65. Support means 67 positions a bundle 66 of optical signal transmission lines in such a manner that the longitudinal axes of the end portions thereof are substantially parallel to that of rod 61 and the ends thereof are disposed adjacent to endface 64. A layer 68 of index matching fluid may be disposed between the ends of the transmission lines and endface 64 to provide good optical coupling therebetween.

Each of the transmission lines in bundles 66 is coupled to a different station. An optical signal from any one of the stations is propagated to the coupler where it is injected into mixer rod 61 where it propagates either directly or by the process of reflection from the interface between rod 61 and layer 62 to mirror 65 from which it reflects and propagates back to endface 64 where it is distributed among all of the transmission lines in bundle 66.

Figure 5:
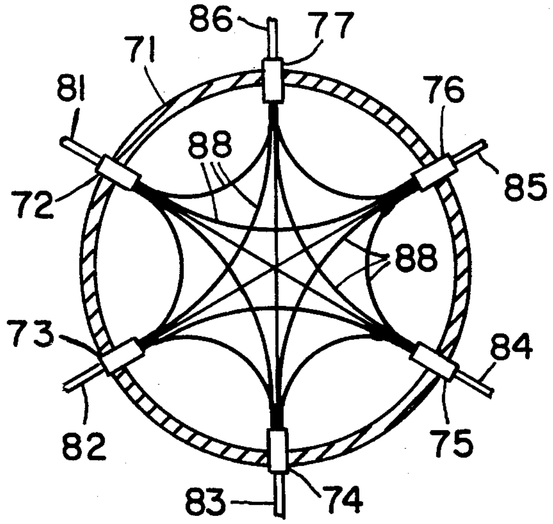
FIG. 5 is a schematic diagram of a further passive optical coupler which may be utilized in the system of FIG. 3.

The coupler of FIG. 5, which is disposed in housing 71, includes a plurality of transparent mixer rods 72 through 77 which are equal in number to the number of stations in the system. Each mixer rod has two planar endfaces that are perpendicular to the axis thereof. One of the optical signal transmission lines 81 through 86 is coupled between each station and a first endface of one of the mixer rods 72 through 77, respectively. The second endface of each mixer rod is connected to the second endface of each of remaining mixer rods by one of the bundles 88 of optical waveguides. Thus, an optical signal from the station associated with transmission line 81, for example, propagates through that transmission line and is injected into mixer rod 72, thereby causing the illumination of all of the optical waveguide bundles disposed at the opposite end thereof. A portion of the optical signal is thereby coupled by one of the waveguide bundles 88 to each of the remaining mixer rods 73 through 77 which couples the signal to each of the remaining stations by transmission lines 82 through 86, respectively.

The network configuration of the system of FIG. 3 is somewhat analogous to an electrical node, and the electrical analog of that system would require the connection of electrical transmission lines or cables to a common point. As applied to electrical systems, the impedance matching problems associated with this approach would present serious difficulties at high frequencies. Hence, the electrical analog has never been seriously considered for high data rate applications. However, impedance matching difficulties do not arise in optical communication systems since optical networks have additional degrees of freedom not possessed by their electrical counterparts.

A comparison of the system of FIG. 3 with the line or loop data bus reveals that signal attenuation due to connector or coupler insertion loss is lowest for the optical star data bus because only one coupler is required in the latter system. In the case of loop or line data buses, there are instances wherein an optical signal must pass through a coupler associated with each station, and since each coupler represents a fixed loss, then the loss in dB of a loop or line data bus must rise linearly with the number of stations. In the system of the present invention, the signal power is divided equally among all of the stations so that the loss in dB rises only logarithmically with the number of stations.

We claim:

1. An optical communication system comprising at least three stations, each of which has means for generating optical signals and means for receiving optical signals, a plurality of optical signal transmission lines having first and second ends, the number of said transmission lines being equal to the number of stations, each of said transmission lines comprising at least one optical waveguide, means for coupling the first end of each of said transmission lines to the generating means and receiving means of a corresponding one of said plurality of stations, and passive optical coupler means connected to the second ends of each of said transmission lines for receiving optical signals from a transmission line connected to any one of said plurality of stations and coupling a portion of that signal to the transmission lines associated with all of the remaining stations.

2. An optical communication system in accordance with claim 1 wherein said passive optical coupler means comprises means for maintaining the second ends of said plurality of transmission lines in a bundle so that said second ends of said transmission lines lie in a plane, and means including a reflecting surface axially disposed a fixed distance from the second ends of said transmission lines for reflecting into each optical waveguide of all of said transmission lines an optical signal emanating from any one of said transmission lines.

3. An optical communication system comprising a plurality of stations, each of which comprises means for generating optical signals, means for receiving optical signals, an elongated transparent mixer rod having first and second planar endfaces substantially perpendicular to the axis thereof, and first and second optical waveguide bundles having one end thereof disposed adjacent to the first endface of said mixer rod, the remaining end of said first bundle being connected to said generating means and the remaining end of said second bundle being connected to said receiving means, a plurality of optical signal transmission lines having first and second ends, the number of said transmission lines being equal to the number of stations, the first end of each of said transmission lines being connected to the second endface of said mixer rod of a corresponding one of said plurality of stations, and passive optical coupler means connected to the second ends of each of said transmission lines for receiving optical signals from a transmission line connected to any one of said plurality of stations and coupling a portion of that signal to the transmission lines associated with all of the remaining stations.

* * * * *